United States Patent [19]

Gowman

[11] Patent Number: 4,562,730

[45] Date of Patent: Jan. 7, 1986

[54] METHOD AND APPARATUS FOR DYNAMIC BALANCE DETECTION OF A CALENDER STRIP

[75] Inventor: Jerry A. Gowman, Oklahoma City, Okla.

[73] Assignee: The Firestone Tire & Rubber Company, Akron, Ohio

[21] Appl. No.: 732,031

[22] Filed: May 8, 1985

[51] Int. Cl.[4] .............................................. G01B 21/08
[52] U.S. Cl. ..................................... 73/150 R; 73/159
[58] Field of Search ............... 73/159, 150 R; 28/158, 28/299; 118/688; 427/9

[56] References Cited

U.S. PATENT DOCUMENTS

| | | |
|---|---|---|
| 2,650,432 | 9/1953 | Adams . |
| 2,665,582 | 1/1954 | Armstrong .......................... 73/159 |
| 3,169,297 | 2/1965 | Strandberg . |
| 3,474,666 | 10/1969 | Litzler . |
| 3,659,454 | 5/1972 | Stevenson . |
| 3,871,212 | 3/1975 | Neugroschl . |
| 3,908,448 | 9/1975 | Jardine . |
| 4,041,806 | 8/1977 | Klar ...................................... 73/159 |
| 4,135,006 | 1/1979 | Readal et al. ................. 73/150 R X |
| 4,480,537 | 11/1984 | Agronin ................................ 100/38 |

Primary Examiner—Jerry W. Myracle
Attorney, Agent, or Firm—Ronald Brietkrenz

[57] ABSTRACT

A method and apparatus which dynamically determines the location of a fabric layer bonded within a moving calender strip of elastomeric material by passing opposed surfaces of the strip partially about a respective one of a pair of measuring rolls forming a part of a two pair over-under rolls. Sensors are connected to each of the measuring rolls and provide a signal in relationship to the rotational speed of each of the measuring rolls. The two signals are compared and provide a third signal indicating the relative position or balance of the fabric layer with respect to the two outer strip surfaces. Since the fabric layer when under the same dynamic tension and conditions will achieve a specific elongation its radial position with respect to the surfaces of the measuring rolls will control the rotational speed of the rolls when contacted by the moving surfaces of the calender strip. The radial relationship of the fabric layer within the strip will effect the speeds of the two measuring rolls as they are rotated by contact with the opposite surfaces of the strip. Each of the measuring rolls may have a plurality of freely rotating axially aligned roll sections which provide individual signals for specific transverse zones of the strip to determine the location of the fabric layer in the transverse direction across the moving strip as well as in the linear direction thereof.

28 Claims, 7 Drawing Figures

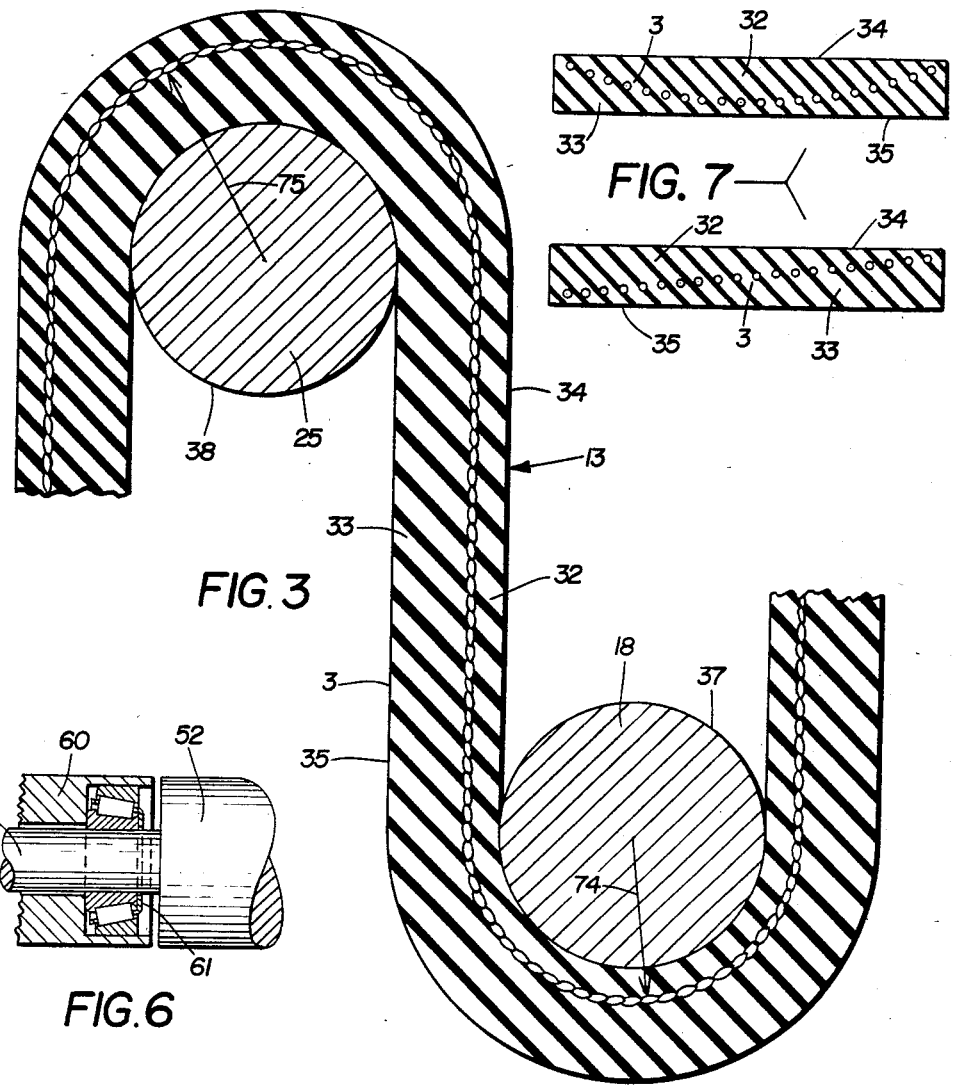
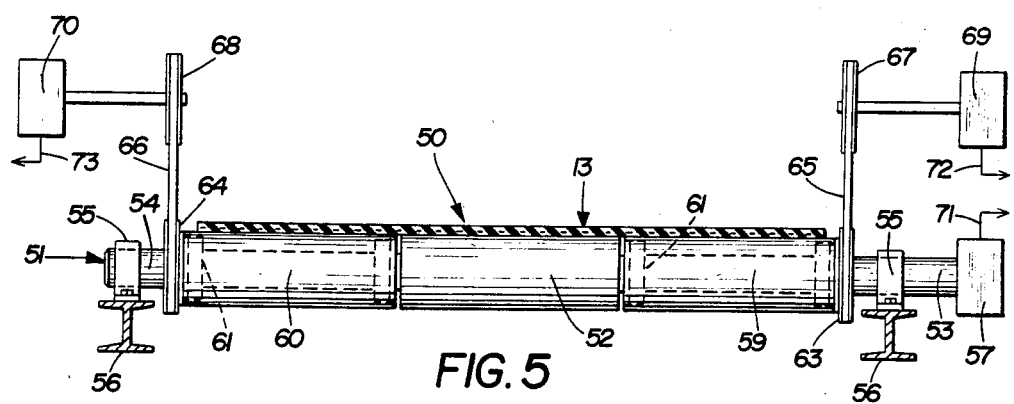

METHOD AND APPARATUS FOR DYNAMIC BALANCE DETECTION OF A CALENDER STRIP

TECHNICAL FIELD

The invention relates to a method and associated apparatus which determines the balance of a calender fabric layer relative to the other material layers of a composite strip. More particularly, the invention relates to such a method and apparatus which dynamically determines the location of a fabric layer within an elastomeric strip by measuring the difference in the rotational speeds of two measuring rolls as opposite surfaces of the moving strip passes about portions of the two rolls.

BACKGROUND ART

Calender strips of various materials are used for numerous applications in various industries including but not limited to the tire industry. Calender strips are used considerably in the tire industry for the production of tires. Such calender strips may be composite strips formed of a plurality of separate layers of different materials which are joined by various means before or upon passing through the calender rolls.

Calender strips used in the production of tires include body plies, tread plies and bend reinforcing material. These strips usually consist of a layer of fabric, cord material and the like bonded between inner and outer layers of an elastomeric material. These calender strips are formed by various processes, a common one of which is a dipping process in which the fabric or cord is passed through an aqueous solution containing formaldehyde and other resins which coat the fabric or cord on both sides prior to passing the coated strip through the calender rolls. The rolls press the strip into the desired configuration and smoothness and integrally bonds the fabric or cord within the elastomer. It is usually desirable that the coated layer be in the center of the resulting composite elastomer strip so that the strip is a "balanced" strip, in contrast to an "unbalanced" calender strip in which the fabric layer is separated different distances from the two opposed outer strip surfaces. However, for certain applications the calender strip may have a specified "off-balance".

It is difficult to obtain absolute accuracy in locating the fabric or cord layer within the elastomer by the primary gauging system for the calender machines. Therefore additional components are required such as beta gauges and/or other nuclear particle type systems to override and correct the primary gauging system of the calender machine to provide the most efficient means of properly locating the layer within the elastomer or coating material. A number of factors can affect the accuracy of the positioning of the fabric within the coating in addition to the calender coating roll unit. Variations in the ratio between the precalender and post-calender tension of the moving strip will effect the balance of the calender strip. Furthermore, variations in the ratio of the viscosity of the two elastomer coating layers usually due to temperature differences in the coating material, will affect the location of the fabric. These temperature differences can be caused by differences in coating roll temperatures, height or volume of the coating material supply and similar factors.

The profile of a calender strip and in particular the location of the fabric or cord layer within the strip has a continuously undulating contour both in the linear and transverse direction of the strip. In addition to the various factors described above which affect the balance of the calender strip, the fabric or cord location is constantly changing due to the constant "bumping" of the primary calender control system gauges and the periodic "bumping" of the calender roll straightening pressures. Other factors that affect the calender strip balance are imperfections in the calender rolls themselves, such as the edge to edge profile of the roll which can change throughout the roll rotation, poor runout or egg shaped rolls, and gear ratios in motor drives of the calender rolls which do not have common gear teeth multiples. Also, variations in the viscosity and/or temperature of the coating material itself has an affect on the balance of the produced calender strip.

Historically, checking balance or off-balance of the calender strip such as the body ply of a tire, has been accomplished by folding a sample strip twice and cutting it with a sharp knife and examining the cut edge visually under a magnifier. The accuracy of this existing test method is to a large degree, subjective and only provides a single instantaneous check which reflects short term variations and does not provide a continuous check over the entire running or construction of the calender strip. It also does not permit immediate adjustments of the calender rolls upon detecting of an unbalanced condition by such prior art test.

The sample strips which usually are approximately 1 inch wide by 18 inches long are just that, samples of the produced strip. These samples require a portion of the calender strip to be destroyed resulting in waste material and additional waste later on when the calendered fabric is cut for use in a tire production area, in that the portion of the finished calender strip near the location where the sample was removed must also be scrapped. Also, if it were possible to accurately read the off-balance from the folded strips, it would require many sample strips to be cut from the main calender strip to ascertain even the average balance due to the continuous changing location both in the transverse and linear direction of the fabric or cord in order to obtain an accurate reading.

Various devices and procedure have been devised for checking certain features of a composite strip containing a fabric or cord layer bonded within an elastomer strip. For example, U.S. Pat. No. 4,041,806 shows a method of dynamically checking the particular adhesion of the cord to the elastomer. U.S. Pat. No. 3,908,448 discloses a method for measuring resistance to vibration of flexible reinforced belt members. U.S. Pat. Nos. 3,659,454 and 3,871,212 disclose methods of testing characteristics of tire fabrics but not the balance of a calender fabric layer used therein. U.S. Pat. No. 3,474,666 is concerned with dynamically testing tires and industrial cords used therein by recording the stress and strain characteristics thereof by measuring the difference in rotation between two motors. However, nothing is shown or indicated in this patent for measuring the balance of a fabric layer in a calender composite strip.

U.S. Pat. No. 3,169,297 discloses an apparatus for dynamically determining the stretch or shrinkage of a continuous web by employing two current generators attached to a pair of rolls whereby movement of the rolls rotate the generators at different speeds depending upon the amount of stretching or shrinkage of the web. While this patent discloses a dynamic system that measures the difference in rotation between two rolls, the rolls do not function in the same manner nor are they used to measure the balance of a calender fabric strip as the subject invention.

U.S. Pat. No. 2,665,582 discloses another prior art apparatus for testing tire tread cord calender layers by cutting a section of tire tread in such a manner that the fabric layers extend beyond the calender rubber section and attaching loads to the ends thereof which extend over rolls so that the necessary stresses can be determined. U.S. Pat. No. 2,650,432 shows still another type of apparatus for measuring the strain of extensible materials such as fiber and various fabrics by the use of a pair of spaced wheels. The wheels pinch the strip therebetween and pull the strip in opposite directions to cause an elongation of the material which is indicated on meters connected to the two stretching rolls. The difference in rotation of the rolls is observable and therefore indicates the differentially elongation produced by the loads applied to the opposite ends of the strip. However, this patent neither discloses the measuring of the balance of a calender strip nor does it show a dynamic apparatus which indicates change in a moving calender strip as does the subject invention.

Accordingly, the need has existed for a method and apparatus for dynamically checking the balance of a fabric layer bonded within a composite calender strip which can be performed while the strip is moving and at a position closely adjacent to the calender rolls enabling nearly instantaneous adjustments to be made to the calender rolls to correct for any misalignment and bearing pressures thereof enabling necessary changes to be made to provide a calender strip in which the fabric layer is balanced therein throughout the longitudinal length as well as in its transverse cross-sectional direction.

There is no known method and apparatus for organic fabrics of which I am aware which achieves these advantages prior to my invention described below and set forth in the appended claims.

DISCLOSURE OF THE INVENTION

Objectives of the invention include providing an improved method and apparatus for dynamic balance detection of a calender strip to enable the location of a fabric layer bonded within an elastomer strip to be detected easily while the strip is running enabling adjustments to be made to the calender rolls to compensate for any unbalance in the strip. Another objective is to provide such an improved method and apparatus in which the linearly moving strip passes about two pairs of over-under rolls and in which each pair of rolls includes a directional roll and a freely rotatably mounted measuring roll which measuring rolls are rotated by opposite surfaces of the moving strip whereby the rolls rotate at rotational speeds in direct relationship to the location of the fabric layer bonded within the elastomer material with respect to the outer strip surface since the fabric layer will have a specific elongation for a specific dynamic tension and temperature condition not achieved by the outer elastomer layers of the strip.

A further objective is to provide a method and apparatus which measures the angular speed of one or more measuring rolls rotated by a moving strip of material in which said angular speed is dependent upon and varies as the distance varies between the center of the roll or rolls and the center line of an inextensible layer of material in the moving strip. Another objective is to provide a method and apparatus which will measure the actual gauge or material thickness applied to one side of an inextensible flat sheet of material by passing the coated strip about a pair of measuring rolls which provide a signal dependent upon their rotational or angular speed since the speed of the rolls are determined by the position of the inextensible strip within the coating material is in contact with one of the rolls. A still further objective is to provide such a method and apparatus which can measure and control the location of a layer of material having a coating on one or both sides thereof to a preset desired off-balance condition within the coating just as accurately as it can control it to a perfect balance.

A still further objective is to provide a method and apparatus in which pulse generators are operatively connected to the shaft of each of the measuring rolls, the outputs of which are fed into a digital comparator or similar detection equipment which provides an output signal or reading of the resulting ratio or difference of the two input signals which will show the difference in the rotational speeds of the two measuring rolls and correspondingly the average distance of the fabric layer from the outer surfaces of the calender strip.

Another objective of the invention is to provide such an improved method and apparatus for dynamic balance detection of a calender strip in which the measuring rolls of each over-under pair of rolls may be formed by a plurality of rolls freely rotatably mounted on a common axis, each of which is connected to a separate counter, to allow independent measurement of various zones of the moving strip including at least the center and two ends zones thereof which will indicate variations in the location of the fabric layer in the transverse direction of the strip instead of providing only an average of the fabric layer location in the transverse direction which is provided by a single measuring roll. A still further objective is to provide such an improved method and apparatus in which a processor and support electronics are connected to the outputs of the measuring roll counters to calculate the required connection signals which can be fed to the air gauges or other controls of an existing calender control system to immediately compensate for any unbalance measured in the moving calender strip. Still another objective is to provide such a method and apparatus in which the measuring rolls preferably have a relatively small diameter to provide greater resolution, and in which the rolls are centerless ground to provide identical outer surfaces with precision tolerances enabling highly accurate readings to be obtained by the rotational differences thereof caused by the moving strip.

These objectives and advantages are obtained by the improved method of the invention for dynamically detecting the balance of a moving calender strip of material formed by at least a single ply of relatively inextensible material contained within a strip of pliable material, the general nature of which may be stated as including the steps of passing a length of a calender strip having first and second outer surfaces about a pair of rolls with the first surface of the strip connecting one of said rolls for rotating said one roll at a certain speed and with the second surface of the strip contacting the other roll for rotating said other roll at another speed with said rolls rotating in opposite directions; generating a first signal in relationship to the rotational speed of said one roll of the pair; generating a second signal in relationship to the rotational speed of said other roll of the pair; and comparing the first and second signals to generate a third signal dependent upon the relationship between the rotational speeds of the two rolls of the roll pair indicating the position of an inextensible material with respect to the first and second outer surfaces.

These objectives and advantages are further obtained by the improved balance detector apparatus of the invention used for determining the position of an internal layer of relatively inextensible material with respect to the two outer surfaces of a generally flat strip of resilient material containing the internal layer during movement of the strip, the general nature of which may be stated as including first and second spaced measuring rolls with one surface of the strip adapted to be partially wrapped about the first roll and with the other surface of the strip adapted to be partially wrapped about the second roll with said partially wrapped strip surfaces rotating the rolls at speeds in relationship to the location of the internal layer with respect to said two surfaces as the strip is moving along a predetermined path; and sensing means responsible to the rotational speeds of the two measuring rolls for comparing the rotational speeds of said measuring rolls for comparing the rotational speeds of said measuring rolls providing an indication of the position of the internal layer with respect to the two strip surfaces.

BRIEF DESCRIPTION OF THE DRAWINGS

A preferred embodiment of the invention, illustrative of the best mode in which applicant has contemplated applying the principles, is set forth in the following description and distinctly pointed out and set forth in the appended claims.

FIG. 3 is a greatly enlarged fragmentary sectional view of the calender strip being partially wrapped about the two measuring rolls of the improved detection apparatus;

FIG. 5 is a front elevational view with portions in section of the lower measuring roll of a modified form of the improved dynamic balance detection apparatus used in conjunction with the improved method of the invention;

FIG. 6 is an enlarged fragmentary sectional view of a portion of the measuring roll of FIG. 5; and FIG. 7 is two enlarged diagrammatic transverse sectional views of the fabric strip showing two different types of fabric layer configurations when bonded within the elastomeric material.

Similar numerals refer to similar parts throughout the drawings.

BEST MODE FOR CARRYING OUT THE INVENTION

Figure 1:
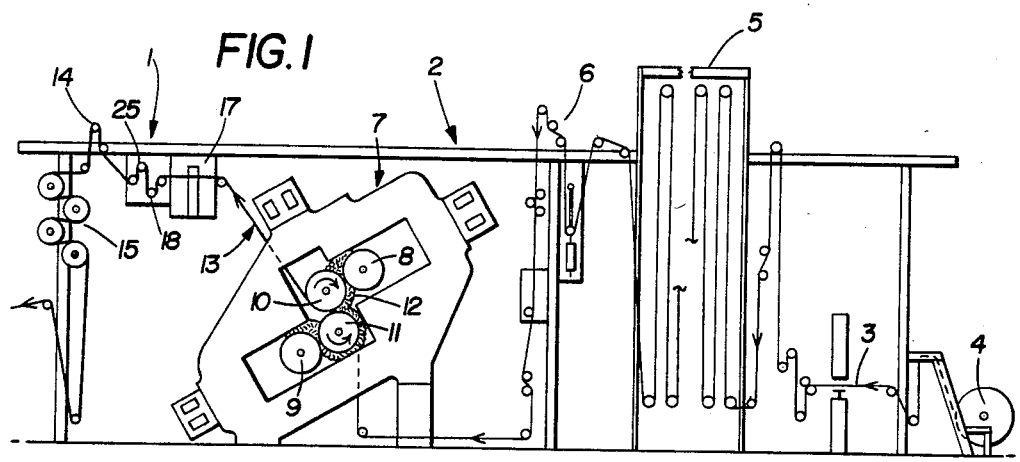
FIG. 1 is a diagrammatic side elevational view of a usual calender roll system in which improved dynamic balance detection apparatus may be incorporated for carrying out the steps of the improved detection method.

The improved dynamic balance detection apparatus for use in performing the method steps of the invention is indicated generally at 1, and is shown in FIG. 1 incorporated within a usual calender system shown diagrammatically and indicated generally at 2. Calender system 2 is of a usual construction consisting of an incoming strip of fabric 3 which is unwound from a supply roll 4 and passed about a series of rollers forming a letoff compensator 5. Strip 3 then passes through a load cell 6 which regulates the tension in the moving fabric strip before it enters into a calender unit 7. Unit 7 consists generally of two pairs of rolls 8 and 10 and 9 and 11. Elastomer material 12 is squeezed into a thin layer by each pair of rolls with the uppermost layer adhering to roll 10 and the lower layer adhering to roll 11. The thickness of the layer is affected by moving roll 8 towards or away from roll 10 and roll 9 towards or away from roll 11. The two layers adhering to rolls 10 and 11 are brought together at their common nip point and squeezed with pressure onto each side of strip 3 to form calender strip 13.

After calender strip 13 leaves calender unit 7 it moves through a beta gauge 17 which measures various thicknesses of strip 13 for adjusting unit 7 if necessary, and then through improved balance detection apparatus 1. The strip then passes through another load cell 14 which assists the calender operator in controlling the tension in the moving strip together with load cell 6. Pre-calender tension is normally 75% to 100% higher than post-calender tension. Calender strip 13 passes about a series of cooling rolls 15 and then continues through other usual calender strip handling and controlling apparatus until being wound on a storage reel for shipment to a storage area or tire manufacturing facility.

The particular calender system indicated at 2 and described above with respect to FIG. 1, is merely one particular arrangement of existing calender roll equipment in which balance detection apparatus 1 may be utilized for achieving the desired results. Preferably, detection apparatus 1 is located closely adjacent to calender unit 7 so that any unbalance in the strip is detected as soon as possible upon the calender strip leaving the unit so adjustment can be made to the setting of rolls 8 and 9 to correct the unbalance.

Figure 2:
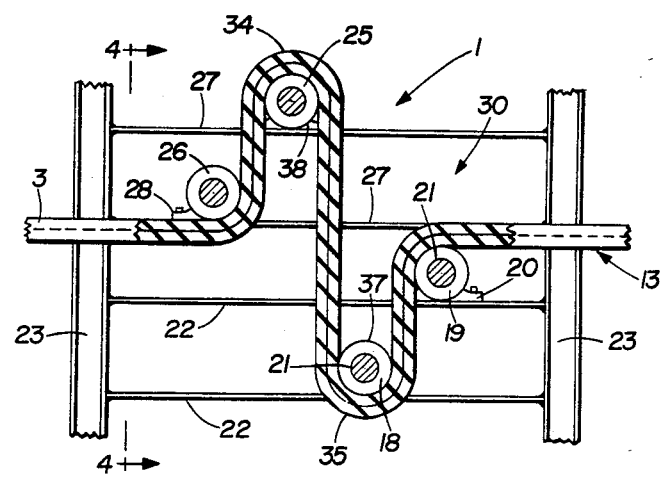
FIG. 2 is an enlarged side elevational view with portions in section of the improved dynamic balance detection apparatus removed from the calender system of FIG. 1.
Figure 4:
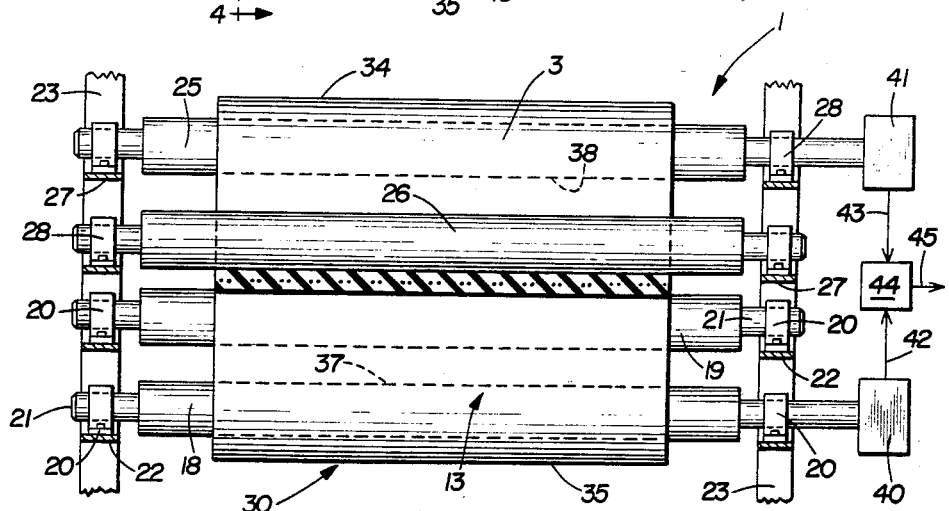
FIG. 4 is a fragmentary sectional view taken on line 4—4, FIG. 2.

Detection apparatus 1 is shown in particular detail in FIGS. 2, 3 and 4 and includes a first or lower measuring roll 18 located below and closely adjacent to a first directional roll 19. Rolls 18 and 19 are cylindrical-shaped rolls freely rotatably supported by a pair of pillow bearings 20 located at reduced diameter ends 21 of each roll. Pillow bearings 20 may be supported on mounting plates 22 which extend between a pair of main end channels 23 as shown in FIGS. 2 and 4 or by various other types of supporting arrangements.

A second or upper measuring roll 25 and an associated directional roll 26 similar to rolls 18 and 19, respectively, are supported on other mounting plates 27 which also extend between end channels 23. Rolls 25 and 26 are mounted by pillow bearings 28 similar to bearings 20 of rolls 18 and 19.

Measuring rolls 18 and 25 preferably are as small as possible for greater resolution, with a preferred diameter being approximately 3 or 4 inches. These rolls preferably are formed of solid steel and are centerless ground to a very high degree of precision with a tolerance of approximately ±0.0001 inches. Also, the outer diameters of rolls 18 and 25 preferably are identical to provide the desired rotational speed readout as described below. Although three or four inches is described as preferred diameters for both rolls 18 and 25, this dimension and equality may vary without affecting the concept of the invention. Likewise, the diameter of directional rolls 19 and 26 preferably are equal to each other but also can vary with respect to the diameter of measuring rolls 18 and 25. Collectively, roll pairs 18-19 and 25-26 are referred to as over-under roll assembly indicated generally at 30.

Referring to FIG. 3, the present invention is based on the premise that fabric layer or strip 3 under dynamic conditions will achieve a specific stretch or elongation and will not change unless the conditions change. If the bare fabric is passed about a roll which has a tachometer or similar device for measuring the speed of rotation of the roll attached thereto, and then about a second roll with a similar speed indicating device attached, the ratio of the two devices would be 1. If an elastomer or similar pliable or resilient material then is placed on the fabric as occurs in the calender system and the strip passed about the two rolls, the ratio of the output readings of the two speed measuring devices will indicate the average distance of the fabric layer from the outer surfaces of the calender strip. A ratio of one will indicate that the fabric strip is located in the center of the calender strip and at equal distances from the strip surfaces, and a ratio less than or greater than one will show unequal distance of the fabric strip from the calender strip surfaces, that is, an unbalanced strip. This can just as easily be accomplished by using differences between the pair of counters.

Composite calender strip 13 is shown in FIG. 3 in an enlarged sectional view wrapped partially about measuring rolls 18 and 25. Strip 13 includes the fabric strip 3 which may be a twisted body ply cord formed of a corded type substance, such as steel or a textile fabric as shown in drawing. Strip 3 can also be a flat untwisted sheet of inextensible material such as steel, fiberglass or various textiles. Strip 3 is bonded between layers 32 and 33 of an elastomeric material used in the production of passenger vehicle tires, and has generally flat planar outer surfaces 34 and 35, respectively.

As shown in FIG. 3, strip surface 34 engages and is partially wrapped about the outer cylindrical surface 37 of lower measuring roll 18 with opposite strip surfaces 35 engaging and being partially wrapped about the outer cylindrical surface 38 of upper measuring roll 25. The amount of wrap of strip 13 about measuring rolls 18 and 25 need not be 180° as shown in the drawings but can vary depending upon a particular calender strip application and the available space in a calender strip line. The particular material of strip layers 32 and 33 also will effect the amount of wrap required, since in certain applications it is believed a wrap of only 45° or less will be sufficient.

Directional rolls 19 and 25 may not be required for certain applications if the incoming and outgoing directional angles of moving strip 13 provide the desired amount of wrap about measuring rolls 18 and 25. In many applications, such as shown in the drawings, directional rolls 19 and 25 enable the path line of the calender strip to be maintained without requiring modifications to an existing calender line in which detection apparatus 1 may be incorporated.

Referring to FIG. 4, measuring rolls 18 and 25 are connected to high resolution pulse counters 40 and 41, respectively, or similar types of devices. Pulse generators 40 and 41 produce signals in direct relationship to the rotational speed of their respective measuring rolls which are transmitted through lines 42 and 43 into a comparator 44, computer, or dual channel pulse counter or other similar type of device. Comparator 44 compares the incoming signals received from pulse generators 40 and 41 and provides another signal, the magnitude of which indicates the ratio between the rotational speeds of rolls 18 and 25 and correspondingly the amount of unbalance, if any, existing in moving strip 13. The signal or series of signals produced by comparator 44 then is transmitted by line 45 to the controls of calender unit 7 to adjust the appropriate air gauges or other control components to compensate for any unbalance detected by measuring rolls 18 and 25. Preferably, pulse counters 40 and 41 will be high resolution units and digital counters for example, providing approximately 1,800 pulses per revolution of the rolls.

In one embodiment, the output of the pulse counters are fed to comparator 44 which will count the pulses from each counter for a base time of approximately six seconds. The difference in the total pulses per base time unit becomes the output of comparator 44. This output is then filtered to provide an output to a readout device and/or fed to the calender skim wall gauge control system for the control adjustment. In this example, the rollers will have a diameter of 3.0000 inches and the pulse generators will provide 1,800 pulses per revolution. Assuming that the total calender gauge is 0.037 inches and is running 0.001 inches off-balance at a speed of 50 yards per minute, then the light side of the strip indicated by strip section 32, would produce 33,969 counts in six seconds and heavy side of the strip indicated at 33, would produce 33,947 counts for a difference of 22 counts. This count difference then can be used to calculate the actual off-balance dimension of fabric layer 3 with respect to strip surfaces 34 and 35 and provide for compensation thereof. In actual practice, one counter would be set to cycle at a preset number and would reset the second counter to zero resetting itself at the same time. When it reaches the preset number, the value of the second counter is taken and compared to the reset number of the first counter. This would be "length basing" rather than "time basing" as described above.

The use of a single measuring roll at the lower and upper locations as shown by rolls 18 and 25, will provide the averaged unbalanced condition across the transverse width of moving calender strip 13. Although this average reading is satisfactory for most situations and provides for a higher degree of unbalance detection and compensation than heretofore possible, it may be desirable in certain applications to measure the unbalance of the inner inextensible layer or strip 3 in zones transversely across the composite linearly moving strip in addition to the average unbalance in the longitudinal direction as is provided by over-under roll assembly 30. The position of inner strip 3 can vary in a transverse direction across the strip as shown diagrammatically by the two transverse strip sectional views shown in FIG. 7. FIG. 7 is merely illustrative of two types of an unbalance that can occur in the fabric in the transverse direction. This type of fabric unbalance would not be sufficiently detected by single measuring rolls 18 and 25 since they provide only an average reading of the unbalance in the transverse direction.

This limitation of roll assembly 30 can be reduced by the particular measuring roll configuration shown in FIG. 5 and indicated generally at 50. Measuring roll 50 provides a construction for increasing the accuracy of the detection method and apparatus by providing independent measurements of the moving calender strip in a plurality of transverse zones across the strip. This modification measures a center zone and the two outer edge zones of moving strip 13. In a completed assembly the detection apparatus will consist of two modified measuring rolls 50 instead of the single roll shown in FIG. 5, and preferably two associated directional rolls similar to rolls 19 and 26 described above.

Roll 50 includes a main shaft indicated generally at 51, having a precision ground cylindrical center roll section 52 formed integrally therewith or firmly secured thereto, and two reduced diameter end sections 53 and 54 extending axially outwardly therefrom. Shaft ends 53 and 54 are rotatably supported on a pair of pillow bearings 55 mounted on a pair of support beams 56 or other supporting structure. Reduced shaft end 53 is connected to a pulse counter or tachometer 57 similar to counters 40 and 41 discussed above. A pair of live precision ground, hollow edge roll sections 59 and 60 are freely rotatably mounted by tapered roller bearings 61 (FIG. 6) on reduced shaft ends 53 and 54, respectively, axially adjacent center roll section 52.

Timing gears or pulleys 63 and 64 are connected to the outer ends of edge roll sections 59 and 60, respectively, and are connected by timing belts 65 and 66 to a second pair of timing gears 67 and 68 which are connected to pulse counters or roto-pulse units containing digital counters 69 and 70, respectively. Counters 69 and 70 are similar to counter 57 and supply signals through line 71, 72 and 73 to a comparator, microprocessor, computer or similar equipment as a comparator 44 discussed above. These three incoming signals will be compared with the three signals supplied by the other three sections of a second measuring roll similar to roll 50 which form the over-under roll assembly similar to assembly 30. The comparison of the six incoming signals will generate three control signals indicating any unbalance existing in the three transverse zones of strip 13 corresponding with roll sections 52, 59 and 60. These three unbalance indicating signals will enable appropriate correction and compensation to be performed automatically or manually on the calender roll system to eliminate any unbalance which may occur in any of the three transverse zones. This arrangement will enable the detection method and apparatus to detect a type of fabric strip unbalance as that shown in FIG. 7 which would not be readily detectable by the use of a single measuring roll configuration of rolls 18 and 25 shown in the embodiment of FIGS. 2 and 4.

Preferably, the measuring rolls are located as close together as possible since it provides a more instantaneous measurement of the same linear length of passing calender strip than would be possible if the measuring rolls were placed some distance apart. Also, the amount of wrap about the measuring rolls can vary so long as the rolls rotate without slippage in direct proportion of the linear movement of the calender strip past the rolls. Although it is preferred that the measuring rolls are identical and have the same diameters and accurately ground outer surfaces, the diameters can vary between the rolls but would require an additional compensation factor in the comparator for calculating the resulting control signal generated by the two incoming pulse counters.

The moving strip and rolls of the improved balance detection apparatus may run at various speeds since the main criteria is the rotational speed differential as detected by the measuring rolls. The limiting factor would be the ability of the counters to count discrete pulses as the speed increases.

Summarizing the above, the improved method is shown particularly in FIG. 2 and shows an incoming calender strip having an inextensible layer or sheet of material located within a strip formed of pliable or resilient outer layers, and in particular an elastomer of the type used in the formation of vehicle tires. The strip passes about a pair of measuring rolls whereby opposite surfaces of the strip is wound partially about and rotates an associated one of the measuring rolls. These measuring rolls communicate with counting devices or pulse generators which generate independent signals in direct relationship to the rotational speed of the rolls, which speed is directly proportional to the radial location of the inextensible fabric layer or strip within the composite calender strip much in the same manner as the speed of rotation of a pulley would be based upon the radial distance that the pulley drive belt is located from the center of the pulley when extending about the pulley.

Next, the signals generated by the rotational speed of the revolving rolls are fed to a comparator or similar device which generates a third signal in direct relationship to the ratio of the incoming signals. This third signal indicates the location of the inextensible layer within the composite calender strip and can be used to automatically control the calender roll control equipment or provide only a visual, audible or graphic indication of the unbalance.

The particular pulse generator as well as the comparator unit used in the roll assembly are readily available equipments well known in the art and anyone skilled in the art can easily determine the particular type of equipment for use in a particular balance detection apparatus. Therefore, this equipment is shown in block diagram form only and is not illustrated in further detail.

It is believed that the principle on which the invention is based is best illustrated in FIG. 3 in which the radial distance of the fabric layer from the center of the measuring roll 18 indicated at 74, is less than the radial distance indicated at 75 of the fabric layer from the center of measuring roll 25. Also, the embodiment illustrated in FIG. 5 shows a modification which increases the accuracy of the balance detection apparatus for those calender strips in which inextensible fabric layer 3 is not parallel with strip outer surfaces 34 and 35 in the transverse direction of the strip.

Although the particular embodiment illustrated and described above is directed to the control of a calender strip used in the making of vehicle tires the principles can be applicable to other industries wherein a calender strip of material which is bonded, molded or retained in some manner within one or more outer layers of a pliable or resilient type material. Also, due to the changing contour of the inner strip of relatively inextensible material the improved balance detection apparatus and method may not always produce a perfect balance at every location on the strip, it will provide a more accurately controlled average balance throughout the strip in both the longitudinal and transverse directions.

Furthermore, the improved balance detection apparatus and method also can be used for detecting the gauge or thickness of a coating applied to only one side of a flat relatively inextensible sheet of material such as metal or plastic. In this situation, the balance detector would not detect balance per se, but would provide a signal which is directly proportional to the actual gauge or thickness of the one sided coating. In this embodiment, one surface of the coated strip will rotate one of the measuring rolls with the surface of the coating rotating the other measuring roll, with the signals produced thereby being compared to determine the coating thickness. Again, the principles of the improved apparatus and steps of the detection method described above would be similar.

Accordingly, the improved method and dynamic balance detection apparatus is simplified, provides an effective, safe, inexpensive, and efficient method and apparatus which achieves all the enumerated objectives, provides for eliminating difficulties encountered with prior methods and apparatus, and solves problems and obtains new results in the art.

In the foregoing description, certain terms have been used for brevity, clearness and understanding; but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the improved method and apparatus for dynamic balance detection of a calendered strip is carried out, constructed and used, the characteristics of the invention, and the advantageous, new and useful results obtained; the new and useful structures, devices, elements, arrangements, parts, combinations, and method steps, are set forth in the appended claims.

What is claimed is:

1. A method for dynamically detecting the balance of a moving calender strip of material formed by at least a single ply of relatively inextensible material contained within a strip of pliable material, including the steps of:
   (a) passing a length of the calender strip having first and second outer surfaces about a pair of rolls with the first surface of the strip contacting one of said rolls for rotating said one roll at a certain speed and with the second surface of the strip contacting the other roll for rotating said roll at another speed with said rolls rotating in opposite directions;
   (b) generating a first signal in relationship to the rotational speed of said one roll of the pair;
   (c) generating a second signal in relationship to the rotational speed of said other roll of the pair; and
   (d) comparing the first and second signals to generate a third signal dependent upon the relationship between the rotational speeds of the two rolls of the roll pair indicating the position of the relatively inextensible material with respect to the first and second outer surfaces.

2. The method defined in claim 1 including the step of providing each roll of the roll pair with a plurality of freely rotatably mounted roll sections adapted to extend transversely across the path of the moving strip; and in which the first and second signals generated by the moving strip passing over the roll of each roll pair consists of a plurality of independent signals in relationship to the rotational speed of the individual roll sections of each roll.

3. The method defined in claim 2 in which the comparison of the plurality of independent signals of the first and second signals generates the third signal indicating the position of the inextensible material in the calender strip with respect to the outer strip surface in both a transverse and linear direction.

4. The method defined in claim 2 in which each roll includes three roll sections consisting of a center roll section and two edge roll sections; in which a pulse generator is operatively connected to each of the roll sections for producing the independent signals forming the first and second signals; and in which the independent signals produced by the roll sections generate the third signal which consists of three separate signals indicating the position of the inextensible material in three zones in a transverse direction across the moving strip.

5. The method defined in claim 4 in which the center roll section is fixed to an axially extending shaft for rotation with said shaft; and in which the edge roll sections are freely rotatably mounted on the shaft on opposite sides of the center roll section.

6. The method defined in claim 1 in which pulse generators are operatively connected to the rolls for generating the first and second signals.

7. The method defined in claim 1 in which the rolls are cylindrical-shaped solid metal rolls of equal diameter.

8. The method defined in claim 1 in which the ply of inextensible material is a textile fabric and the pliable material is an elastomer.

9. The method defined in claim 1 in which the ply of inextensible material is a corded fabric for use as a vehicle tire body ply; and in which the pliable material is molded rubber.

10. A system for dynamically detecting the balance of a layer of relatively inextensible material bonded within a moving calender strip of elastomeric material including:
    (a) a first pair of rolls including a directional roll and a measuring roll, said measuring roll being engaged by a first surface of the moving strip which rotates said measuring roll at a speed in relationship to the position of the inner layer from said first surface;
    (b) a second pair of rolls located upstream of the first pair and including a directional roll and a measuring roll, said measuring roll being engaged by a second surface of the moving strip which rotates said measuring roll at a speed in relationship to the position of the inner layer from said second surface; and
    (c) sensor means operatively connected to the first and second measuring rolls providing an output signal indicative of the relationship between the rotational speeds of the two rolls and correspondingly the relationship of the inner layer with respect to the first and second outer surfaces of the moving strip.

11. The system defined in claim 10 in which each of the measuring rolls includes axially aligned roll sections independently rotatably mounted with respect to each other; in which the sensor means includes a plurality of sensors each connected to a respective one of the roll sections for providing the output signal consisting of a plurality of separate signals; and in which said output signals are fed to comparator means for providing a plurality of control signals indicating the position of the inner layer with respect to the outer surfaces of the moving strip within transverse zones across the strip corresponding to the roll sections.

12. The system defined in claim 11 in which each roll consists of three roll sections, a center section and two edge sections; and in which the sensor means is a plurality of pulse generators, each operatively connected to a respective one of the roll sections.

13. A dynamic balance detector for determining the position of an internal layer of relatively inextensible material with respect to the two outer surfaces of a generally flat strip of resilient material containing the internal layer during movement of the strip; said detector including:
   (a) first and second spaced measuring rolls with one surface of the strip adapted to be partially wrapped about the first roll and with the other surface of the strip adapted to be partially wrapped about the second roll with said partially wrapped strip surfaces rotating the rolls at speeds in relationship to the location of the internal layer with respect to said two surfaces as the strip is moving along a predetermined path; and
   (b) sensing means responsive to the rotational speeds of the two measuring rolls for comparing the rotational speeds of said measuring rolls providing an indication of the position of the internal layer with respect to the two strip surfaces.

14. The balance detector defined in claim 13 in which the two measuring rolls are cylindrical-shaped solid metal rolls of equal diameter.

15. The balance detector defined in claim 14 in which each of the measuring rolls has a longitudinal axis; in which the axes of the rolls are horizontal and parallel to each other; and in which one of the measuring rolls is spaced vertically above the other roll and spaced laterally therefrom.

16. The balance detector defined in claim 13 in which each of the measuring rolls includes a plurality of axially aligned roll sections adapted to be engaged by the moving strip and rotated independently by a respective transverse zone of the moving strip; and in which the sensing means includes a plurality of sensors connected individually to respective ones of the roll sections for measuring the speed of rotation of each of said individual roll sections.

17. The balance detector defined in claim 16 in which each of the measuring rolls includes three roll sections consisting of a center roll section and a pair of axially spaced edge roll sections; and in which the sensing means includes a plurality of sensors each operatively connected to a respective one of the roll sections for comparing the rotational speeds of the roll sections to provide an indication of the position of the internal layer within the strip in both transverse and linear directions.

18. The balance detector defined in claim 17 in which the center roll section is rigidly mounted on a shaft which has a pair of ends that extend axially outwardly from opposite ends of said center roll section; and in which the edge roll sections are freely rotatably mounted on the shaft ends.

19. The balance detector defined in claim 18 in which the shaft is connected to one of the sensors for measuring the speed of rotation of the center roll section; and in which timing belt means operatively connects each of the edge roll sections to a respective one of the sensors for measuring the speed of rotation of said edge roll section.

20. The balance detector defined in claim 17 in which the sensors are digital pulse counters.

21. The balance detector defined in claim 17 in which comparator means receive the sensor signals for generating a control signal in relationship to said sensor signals for adjusting the position of the internal layer within the resilient strip.

22. The balance detector defined in claim 13 in which the internal layer is a corded substance and the resilient strip material is an elastomer.

23. The balance detector defined in claim 13 in which the internal layer is a corded textile material and the resilient strip material is an elastomer.

24. The balance detector defined in claim 13 in which a directional roll is mounted adjacent each of the measuring rolls for regulating the amount of wrap of the strip about said measuring rolls.

25. The balance detector defined in claim 13 in which the strip is moving linearly at a predetermined speed; and in which the rolls are rotated in opposite direction by the linearly moving strip.

26. A method for dynamically detecting the thickness of a material coating on one side of a relatively inextensible strip of flat material including the steps of:
   (a) passing a length of the coated strip having first and second outer surfaces about a pair of rolls with the first surface of the strip contacting one of said rolls for rotating said one roll at a certain speed and with the second surface of the strip contacting the other roll for rotating said other roll at another speed with said rolls rotating in opposite directions;
   (b) generating a first signal in relationship to the rotational speed of said one roll of the pair;
   (c) generating a second signal in relationship to the rotational speed of said other roll of the pair; and
   (d) comparing the first and second signals to generate a third signal dependent upon the relationship between the rotational speeds of the two rolls of the pair indicating the thickness of the material coating.

27. The method defined in claim 26 in which the first surface is the uncoated surface of the strip of relatively inextensible material and the second surface is the outer surface of the material coating.

28. A detector for determining the thickness of a coating applied to one side of a moving strip of relatively inextensible flat material; said detector including:
   (a) first and second spaced measuring rolls with the coated surface of the strip adapted to be partially wrapped about the first roll and with the uncoated surface of the strip adapted to be partially wrapped about the second roll with said partially wrapped strip surfaces rotating the respective rolls at speeds in relationship to the coated and uncoated surfaces as the strip is moving along a predetermined path; and
   (b) sensing means responsive to the rotational speeds of the two measuring rolls for comparing the rotational speeds of said measuring rolls providing an indication of the thickness of coating.

* * * * *